No. 890,387. PATENTED JUNE 9, 1908.
H. L. WHITE & F. J. ROGERS.
LID FOR COOKING UTENSILS AND SIMILAR RECEPTACLES.
APPLICATION FILED FEB. 18, 1908.

Witnesses
Samuel Payne
R. C. Butler

Inventors
H. L. White and
F. J. Rogers.
By H. C. Everitt Co.
Attorneys

UNITED STATES PATENT OFFICE.

HARRY L. WHITE AND FRANCIS J. ROGERS, OF WHEELING, WEST VIRGINIA.

LID FOR COOKING UTENSILS AND SIMILAR RECEPTACLES.

No. 890,387.

Specification of Letters Patent.

Patented June 9, 1908.

Application filed February 18, 1908. Serial No. 416,612.

*To all whom it may concern:*

Be it known that we, HARRY L. WHITE and FRANCIS J. ROGERS, citizens of the United States of America, residing at Wheeling, in the county of Ohio and State of West Virginia, have invented certain new and useful Improvements in Lids for Cooking Utensils and Similar Receptacles, of which the following is a specification, reference being had therein to the accompanying drawing.

This invention relates to lids for cooking utensils and similar receptacles, and the primary object of our invention is, to provide a lid wherein novel means is employed for preventing the escape of odors that arise from vegetables and other matter being cooked in a utensil.

A further object of this invention is to provide a cooking utensil lid with an absorbent, that will absorb odors and fumes and prevent their escape from a utensil.

With these and other objects in view which will more readily appear as the invention is better understood, the same consists in the novel construction, combination and arrangement of parts to be presently described and then specifically pointed out in the appended claims.

Figure 1:
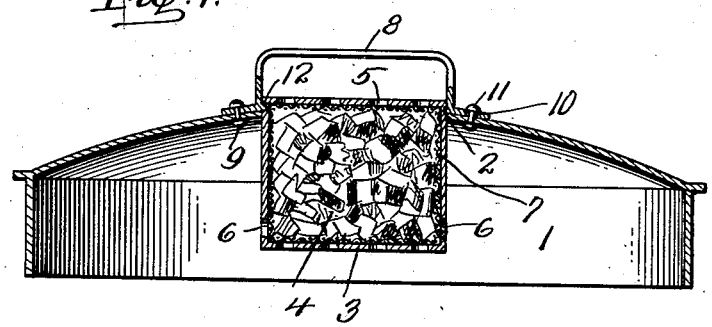
Figure 2:
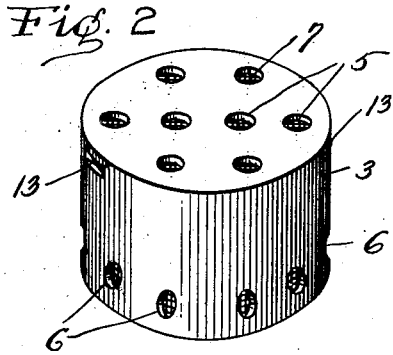
Figure 3:
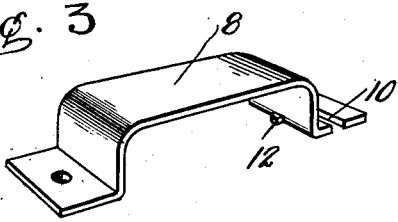

In the drawing: Figure 1 is a cross sectional view of a lid constructed in accordance with our invention, Fig. 2 is a perspective view of the structure that is detachably mounted in the lid, and Fig. 3 is a perspective view of a handle detached from the lid.

In the accompanying drawings, 1 designates a utensil lid having a central opening 2 adapted to receive a casing 3. This casing is filled with charcoal 4 or similar absorbent material. The casing 3 has its top and bottom provided with a plurality of openings 5, and its sides with circumferentially arranged openings 6. These openings are covered with a gauze 7, arranged upon the inner sides of the casing 3, said gauze preventing the charcoal 4 from passing through the openings 5 and 6, and precipitated into a cooking utensil.

To retain the casing 3 within the opening 2 of the utensil lid, we use a handle 8, said handle being pivotally connected to the utensil lid, as at 9 and provided with a slot 10, adapted to receive a headed pin 11 arranged opposite the pivotal point of said handle. The inner vertical sides of the handle 8 are provided with inwardly projecting lugs 12, these lugs engaging in oppositely disposed grooves 13, provided therefor in the casing 3.

It will thus be observed that the casing 3 can be easily removed from the lid when desired.

Having now described our invention what we claim as new, is:—

The combination with a utensil lid having an opening formed therein, of a casing adapted to fit in said opening, said casing having a plurality of openings formed therein, gauze arranged over said openings, an absorbent material within said casing, and a handle pivoted upon said lid for supporting said casing within said lid, substantially as described.

In testimony whereof we affix our signatures in the presence of two witnesses.

HARRY L. WHITE.
FRANCIS J. ROGERS.

Witnesses:
W. D. BUTLER,
THOS. NORRIS.